United States Patent
Sato et al.

(10) Patent No.: US 9,193,881 B2
(45) Date of Patent: Nov. 24, 2015

(54) RADICALLY POLYMERIZABLE PHOTO-CURABLE INK JET INK COMPOSITION

(71) Applicant: Seiko Epson Corporation, Tokyo (JP)

(72) Inventors: Chigusa Sato, Shiojiri (JP); Keitaro Nakano, Matsumoto (JP); Hiroshi Fukumoto, Shiojiri (JP); Hiroaki Kida, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/224,907

(22) Filed: Mar. 25, 2014

(65) Prior Publication Data

US 2014/0288205 A1 Sep. 25, 2014

(30) Foreign Application Priority Data

Mar. 25, 2013 (JP) ................................ 2013-061556

(51) Int. Cl.

| | | |
|---|---|---|
| *C08F 290/06* | (2006.01) | |
| *C08F 2/46* | (2006.01) | |
| *C08G 61/04* | (2006.01) | |
| *C09D 11/101* | (2014.01) | |
| *C09D 11/322* | (2014.01) | |
| *C09D 11/38* | (2014.01) | |

(52) U.S. Cl.
CPC ............ *C09D 11/101* (2013.01); *C09D 11/322* (2013.01); *C09D 11/38* (2013.01)

(58) Field of Classification Search
CPC ...................................................... C09D 11/326
USPC ........................ 522/81, 71, 189, 184, 1; 520/1
See application file for complete search history.

(56) References Cited

U.S. PATENT DOCUMENTS

| | | | |
|---|---|---|---|
| 4,089,800 A | | 5/1978 | Temple |
| 6,294,592 B1 * | | 9/2001 | Herrmann et al. ............... 522/75 |
| 8,393,727 B2 * | | 3/2013 | Sasada et al. .................. 347/100 |
| 2007/0078195 A1 * | | 4/2007 | Kobayashi et al. ............. 522/71 |

FOREIGN PATENT DOCUMENTS

| | | |
|---|---|---|
| JP | 11-129613 A | 5/1999 |
| JP | 11-140365 A | 5/1999 |
| JP | 2001-234093 A | 8/2001 |
| JP | 2007-099833 A | 4/2007 |

* cited by examiner

*Primary Examiner* — Ling Choi
*Assistant Examiner* — Jessica E Whiteley
(74) *Attorney, Agent, or Firm* — Nutter McClennen & Fish LLP; John J. Penny, Jr.

(57) ABSTRACT

A radically polymerizable photo-curable ink jet ink composition contains a radically polymerizable compound, a white pigment, a polymer dispersant, and at least one saturated aliphatic carboxylic acid.

7 Claims, No Drawings

RADICALLY POLYMERIZABLE PHOTO-CURABLE INK JET INK COMPOSITION

BACKGROUND

1. Technical Field

The present invention relates to a radically polymerizable photo-curable ink jet ink composition.

2. Related Art

Ink jet recording ink compositions containing a white pigment are known. For example, JP-A-2007-99833 discloses a white ink jet ink composition mainly containing a white pigment, a polymer dispersant, a photo-curable compound, and a photopolymerization initiator for enhancing the dispersion stability of the ink composition to minimize the settling of the pigment in order to prevent the ink from clogging nozzles. In this ink, the polymer dispersant has a sulfonate group.

However, in the known ink compositions containing a white pigment, viscous sediment is deposited during long-time storage even if the ink composition contains a dispersant. The deposited sediment is difficult to redisperse sufficiently even by agitating the ink composition. The known white pigment-containing ink compositions are inferior in redispersing sediment deposited during long-time storage to restore it to a former dispersion, that is, inferior in redispersibility after long-time storage.

SUMMARY

An advantage of some aspects of the invention is that it provides a radically polymerizable photo-curable ink jet ink composition in which sediment deposited during long-time storage can be easily redispersed even though it contains a white pigment.

The present inventors have found through their intensive research that the above problem can be solved by adding a saturated aliphatic carboxylic acid to a radically polymerizable photo-curable ink jet ink composition containing a white pigment.

According to an aspect of the invention, the following radically polymerizable photo-curable ink jet ink composition is provided. The radically polymerizable photo-curable ink jet ink composition contains a radically polymerizable compound, a white pigment, a polymer dispersant, and at least one saturated aliphatic carboxylic acid.

The saturated aliphatic carboxylic acid may be at least one compound selected from the group consisting of saturated aliphatic monocarboxylic acids and saturated aliphatic dicarboxylic acids.

The saturated aliphatic carboxylic acid may have 2 to 15 carbon atoms in the portion other than the carboxyl group.

The saturated aliphatic carboxylic acid content may be in the range of 0.05% to 0.2% by mass relative to the total mass of the ink composition.

The radically polymerizable photo-curable ink jet ink composition may further contain a photopolymerization initiator.

The white pigment may contain metal oxide particles.

The saturated aliphatic carboxylic acid may be at least one compound selected from the group consisting of the compounds expressed by general formulas (1) and (2):

  (1); and

  (2), wherein n represents an integer in the range of 2 to 15.

The n of the general formulas may represent an integer of 3 to 8.

DESCRIPTION OF EXEMPLARY EMBODIMENTS

Embodiments of the invention will now be described. However, the invention is not limited to the disclosed embodiments, and various modifications may be made without departing from the scope and spirit of the invention.

The radically polymerizable photo-curable ink jet ink composition of an embodiment of the invention contains a radically polymerizable compound, a white pigment, a polymer dispersant, and at least one saturated aliphatic carboxylic acid.

Radically Polymerizable Compound

The ink composition of the present embodiment contains a radically polymerizable compound. Radically polymerizable compounds are liable to produce a viscous sediment in an ink composition during long-time storage. The concept of the present disclosure is effective in such a case.

Radically polymerizable compounds that can be used in the present embodiment include monofunctional, bifunctional, trifunctional, tetrafunctional, pentafunctional and hexafunctional (meth)acrylates. Although radically polymerizable compounds will be further described in detail, the radically polymerizable compound used in the present embodiment is not limited to the following. In the description, (meth)acrylate refers to an acrylate and the corresponding methacrylate.

Exemplary monofunctional (meth)acrylates include, but are not limited to, hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethysuccinic acid, 2-methacryloyloxyhexahydrophthalic acid, 2-methacryloyloxyethyl-2-hydroxypropyl phthalate, butoxy diethylene glycol (meth)acrylate, trifluoroethyl (meth)acrylate, perfluorooctylethyl (meth)acrylate, 2-hydroxy-3-phenoxypropyl (meth)acrylate, ethylene oxide-modified phenol (meth)acrylate, ethylene oxide-modified cresol (meth)acrylate, ethylene oxide-modified nonylphenol (meth)acrylate, polyethylene oxide-modified nonylphenol (meth)acrylate, ethylene oxide-modified 2-ethylhexyl (meth)acrylate, Carbitol (meth)acrylate, oligoester (meth)acrylate, epoxy (meth)acrylate, urethane (meth)acrylate, methyl (meth)acrylate, n-butyl (meth)acrylate, 2-ethylhexyl (meth)acrylate, lauryl (meth)acrylate, allyl (meth)acrylate, glycidyl (meth)acrylate, benzyl (meth)acrylate, and dimethylaminomethyl (meth)acrylate.

Exemplary bifunctional (meth)acrylates include, but are not limited to, 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentyl glycol di(meth)acrylate, ethylene oxide-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated-ethoxylated bisphenol A di(meth)acrylate, tricyclodecane di(meth)acrylate, diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, ethylene glycol di(meth)acrylate, triethylene glycol di(meth)acrylate, polyethylene glycol di(meth)acrylate, and polypropylene glycol di(meth)acrylate.

Exemplary trifunctional (meth)acrylates include, but are not limited to, trimethylolpropane tri(meth)acrylate, trimethylolethane tri(meth)acrylate, alkylene oxide-modified trimethylolpropane tri(meth)acrylate, pentaerythritol tri(meth)acrylate, dipentaerythritol tri(meth)acrylate, trimethylolpropane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl) isocyanurate, hydroxypivalic aldehyde-modified dimethylolpropane tri(meth)acrylate, sorbitol tri(meth)acrylate, propoxylated trimethylolpropane tri(meth)acrylate, ethoxylated glycerin triacrylate, trimethylolethane tri(meth)acrylate, and trimethylolpropane tri(meth)acrylate.

Exemplary tetrafunctional (meth)acrylates include, but are not limited to, pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate, dipentaerythritol tetra(meth)acrylate, and tetramethylolmethane tetra(meth)acrylate.

Exemplary pentafunctional (meth)acrylates include, but are not limited to, sorbitol penta(meth)acrylate and dipentaerythritol penta(meth)acrylate.

Exemplary hexafunctional (meth)acrylates include, but are not limited to, dipentaerythritol hexa(meth)acrylate, sorbitol hexa(meth)acrylate, alkylene oxide-modified phosphazene hexa(meth)acrylate, and caprolactone-modified dipentaerythritol hexa(meth)acrylate.

Other radically polymerizable compounds may be used without particular limitation, including unsaturated carboxylic acids and salts thereof, such as acrylic acid, methacrylic acid, itaconic acid, crotonic acid, isocrotonic acid, and maleic acid, esters, urethane, amides, anhydrides, acrylonitrile, styrene, unsaturated polyesters, unsaturated polyethers, unsaturated polyamides, and unsaturated urethanes. More specifically, examples of these radically polymerizable compounds include, but are not limited to, acrylic acid derivatives, such as bis(4-acryloxypolyethoxyphenyl)propane and diacetone acrylamide; methacrylic acid derivatives, such as 2,2-bis(4-methacryloxypolyethoxyphenyl)propane; allyl compound derivatives, such as allyl glycidyl ether, diallyl phthalate, and triallyl trimellitate; commercially available compounds disclosed in "Crosslinking Agent Handbook" (in Japanese, S. Yamashita, 1981, Taiseisha), "UV/EB Curing Handbook (Material Edition)" (in Japanese, K. Kato, 1985, Kobunshi Kankokai), "Applications and Markets of UV/EB Curing Technology" (in Japanese, Edited by RadTech Japan, p. 79, 1989, CMC Publishing), or "Polyester Resin Handbook" (in Japanese, E. Takiyama, 1988, the Nikkan Kogyo Shinbun), and radically polymerizable or crosslinkable monomers, oligomers and polymers known in the art.

From the viewpoint of easy curing, acrylates are advantageously used.

The above-cited radially polymerizable compounds may be used singly or in combination.

The content of the radically polymerizable compound is preferably 40% to 80% by mass, more preferably 60% to 80% by mass, still more preferably 65% to 75% by mass, relative to the total mass of the ink composition. The radically polymerizable compound with such a content can be easily dissolved in the ink composition, and the use of such an amount of radically polymerizable compound allows the ink composition to maintain a low viscosity and can enhance the curability and storage stability of the ink composition.

White Pigment

The ink composition of the present embodiment contains a white pigment. White pigments generally have higher specific gravity than other pigments and are liable to settle accordingly. The concept of the present disclosure is effective in the case of using a white pigment. The white pigment may be, but is not limited to, a commercially available inorganic or organic white pigment or hollow particles. The white pigment used in the present embodiment may have a specific gravity in the range of 3.8 to 4.1. The present disclosure is particularly effective in such a case.

Examples of the inorganic white pigment include, but are not limited to, titanium oxide, calcium carbonate, barium sulfate, silica fine powder and other forms of silica, calcium silicate, alumina, zinc oxide, cerium oxide, talc, and clay.

Preferably, the white pigment contains metal oxide fine particles. Metal oxide fine particles generally have higher refractive indices and are accordingly likely to exhibit higher whiteness than other materials. Examples of the metal oxide fine particles include, but are not limited to, particles of alumina, titanium oxide, zinc oxide and cerium oxide. In particular, titanium oxide fine particles can exhibit satisfactory hiding power and coloring power as a pigment. Titanium oxide fine particles generally have a lower specific gravity and a higher refractive index than other inorganic white pigments and are chemically and physically stable. Also, titanium oxide is generally resistant to acids and alkalis and other conditions.

Examples of the organic white pigment include, but are not limited to, organic salts disclosed in JP-A-11-129613 and alkylene-bis-melamine derivatives disclosed in JP-A-11-140365 and JP-A-2001-234093. Commercially available organic white pigments include Shigenox OWP, Shigenox OWPL, Shigenox FWP, Shigenox FWG, Shigenox UL, and Shigenox U (each produced by Hakko Chemical).

The hollow particles may be, but are not limited to, thermoplastic particles substantially made of organic polymer, disclosed in U.S. Pat. No. 4,089,800.

Preferably, the white pigment is treated with silica, alumina, zinc oxide, zirconia, or an organic compound. The white pigment treated with these materials is, in general, dispersible, lipophilic and hydrophilic and resistant to weather.

It is known that white pigments treated with alumina, silica, zirconia or the like have OH groups at the surfaces thereof, and that alumina-treated white pigment surfaces are rather neutral, silica-treated surfaces are acid, and zirconia-treated surfaces are basic.

Preferably, the white pigment particles have an average particle size of 100 nm or more, more preferably 200 nm or more. The upper limit of the average particle size of the white pigment particles is preferably 10 µm, more preferably 1 µm, and still more preferably 300 nm. The average particle size can be controlled by selecting an appropriate pigment, dispersant and dispersion medium, and setting appropriate dispersion and filtering conditions. By controlling the particle size in the above range, the resulting ink composition can be stably ejected. In addition, when the white pigment has such an average particle size, the ink composition is likely to exhibit satisfactory whiteness and hiding power. The average particle size can be measured with a particle size distribution meter (for example, UPA-EX 150 manufactured by Nikkiso).

The white pigment content of the ink composition is preferably 5% to 50% by mass, more preferably 5% to 30% by mass, still more preferably 5% to 20% by mass, relative to the total mass of the ink composition. The use of the white pigment with such a content allows the ink composition to maintain a low viscosity and exhibit good storage stability and high redispersibility after long-time storage.

In the preparation of the ink composition, before being mixed with other materials, the white pigment may be dispersed in a dispersion medium and thus used in the form of dispersion. The white pigment can be dispersed with any dispersion device. Examples of the dispersion device include, but are not limited to, a ball mill, a sand mill, an attritor, a roll mill, a jet mill, a homogenizer, a paint shaker, a kneader, an agitator, a Henschel mixer, a colloid mill, an ultrasonic homogenizer, a pearl mill, and a wet jet mill.

The dispersion medium for the white pigment dispersion may be, but is not limited to, a radically polymerizable compound. A low-viscosity radically polymerizable compound is preferred. In general, the use of such a dispersion medium allows the white pigment to disperse satisfactorily and enables the ink composition to be easily handled.

Polymer Dispersant

The ink composition of the present embodiment contains a polymer dispersant. The polymer dispersant interacts with the functional group of the white pigment to attach to the surfaces of the white pigment particles. Consequently, the white pigment is dispersed in the ink composition by the steric hindrance or electrical repulsion of the attached polymer dispersant. Therefore, the polymer dispersant can be appropriately selected according to the charge and other conditions at the surfaces of the white pigment particles. The polymer dispersant preferably has at least either an acid value or an amine value, and more preferably has both at a comparable level. The use of such a polymer dispersant enables alumina-treated white pigment, silica-treated white pigment and zirconia-treated white pigment to disperse more satisfactorily. The term polymer dispersant used herein refers to a dispersant of a polymer having a repeating unit, and particularly refers to a resin dispersant. Preferably, the polymer dispersant may have a molecular weight of, but not limited to, 1,000 to 50,000.

Examples of the polymer dispersant include, but are not limited to, vinyl resins, such as polyvinyl alcohols and polyvinyl pyrrolidone; acrylic resins, such as polyacrylic acid, acrylic acid-acrylonitrile copolymer, potassium acrylate-acrylonitrile copolymer, vinyl acetate-acrylic ester copolymer, and acrylic acid-acrylic ester copolymer; styrene-acrylic resins, such as styrene-acrylic acid copolymer, styrene-methacrylic acid copolymer, styrene-methacrylic acid-acrylic ester copolymer, styrene-α-methylstyrene-acrylic acid copolymer, and styrene-α-methylstyrene-acrylic acid-acrylic ester copolymer; styrene-maleic acid copolymer; styrene-maleic anhydride copolymer; vinyl naphthalene-acrylic acid copolymer; vinyl naphthalene-maleic acid copolymer; vinyl acetate-based copolymers, such as vinyl acetate-ethylene copolymer, vinyl acetate-vinyl ethylene fatty acid copolymer, vinyl acetate-maleic acid ester copolymer, vinyl acetate-crotonic acid copolymer, and vinyl acetate-acrylic acid copolymer; and salts of these polymers. Among these, preferred are copolymers of a monomer having a hydrophobic group and a monomer having a hydrophilic group, and polymers whose molecules have both a hydrophobic group and a hydrophilic group. The above polymer dispersants may be used singly or in combination.

The polymer dispersant is added preferably in a proportion of 1 to 10 parts by mass, more preferably 2 to 7 parts by mass, relative to the mass (100 parts by mass) of the white pigment. The addition of the polymer dispersant in such a proportion allows the white pigment to adsorb the polymer dispersant and disperse satisfactorily, and can minimize the increase in the viscosity of the ink composition caused by the presence of polymer compounds. In addition, the polymer dispersant is likely to act as a surfactant to reduce the surface tension of the ink composition and thus can minimize the occurrence of ink jet ejection failure.

Saturated Aliphatic Carboxylic Acid

The ink composition of the present embodiment contains one or more saturated aliphatic carboxylic acids. The white pigment is dispersed in the ink composition by the steric hindrance or electrical repulsion of the polymer dispersant attached to the surfaces thereof. However, if a known ink composition containing a polymer dispersant together with a white pigment is allowed to stand for a long time such as a year or more, viscous sediment is deposited. The viscous sediment is difficult to redisperse even by agitation.

The reason can be as follows. The polymer dispersant attached to the surfaces of the white pigment particles will probably separate from the pigment particles as time passes. Once the polymer dispersant has separated, the white pigment particles, which have been dispersed by the steric hindrance and electrical repulsion of the polymer dispersant, aggregate together. The aggregated white pigment settles to form a viscous sediment that is difficult to redisperse and restore to a former dispersion even by agitation. The reason is not limited to this and other factors may be involved in the occurrence of the viscous sediment.

On the other hand, in the ink composition of the present embodiment, which contains a saturated aliphatic carboxylic acid together with a white pigment, the polarized saturated aliphatic carboxylic acid attaches to the surfaces of the white pigment particles. Consequently, the pigment particles electrically repel from each other or the saturated aliphatic carboxylic acid attracts the separated polymer dispersant, and thus the white pigment is stably dispersed. The saturated aliphatic carboxylic acid in the ink composition may prevent the polymer dispersant from separating from the pigment particles, and the white pigment thus can be stably dispersed in the ink composition.

Saturated aliphatic carboxylic acids are carboxylic acids having no unsaturated carbon-carbon bonds and containing no aromatic rings. The aliphatic skeleton of the saturated aliphatic carboxylic acid may have substituents. Examples of the saturated aliphatic carboxylic acid include, but are not limited to, succinic acid, glutaric acid, adipic acid, pimelic acid, suberic acid, azelaic acid, sebacic acid, propionic acid, butyric acid, valeric acid, caproic acid, enanthic acid, caprylic acid, pelargonic acid, capric acid, lauric acid, myristic acid, palmitic acid, margaric acid, and citric acid. The aliphatic skeleton may be linear or branched, and is preferably linear. A linear aliphatic skeleton can enable the sediment deposited during long-time storage to redisperse more effectively.

Preferably, the above-mentioned one or more saturated aliphatic carboxylic acids include at least either a saturated aliphatic monocarboxylic acid or a saturated aliphatic dicarboxylic acid, and more preferably include a saturated aliphatic dicarboxylic acid. These saturated aliphatic carboxylic acids can enable the sediment deposited during long-time storage to redisperse more effectively.

Preferably, the saturated aliphatic carboxylic acid has 2 to 15 carbon atoms, more preferably 3 to 8 carbon atoms, in the portion other than the carboxyl group. Such a saturated aliphatic carboxylic acid can enable the sediment deposited during long-time storage to redisperse more effectively.

Preferably, the saturated aliphatic carboxylic acid content of the ink composition is 0.05% to 0.25% by mass, more preferably 0.09% to 0.20% by mass, and still more preferably 0.09% to 0.15% by mass, relative to the total mass of the ink composition. The use of the saturated aliphatic carboxylic acid with such a content can enable the sediment deposited during long-time storage to redisperse more effectively.

Preferably, the saturated aliphatic carboxylic acid contains at least one compound selected from the group consisting of the compounds expressed by the following general formula (1) or (2):

$$COOH-(CH_2)_n-COOH \qquad (1)$$

$$CH_3-(CH_2)_{n-1}-COOH \qquad (2)$$

wherein n represents an integer in the range of 2 to 15. Such a saturated aliphatic carboxylic acid can enable the sediment deposited during long-time storage to redisperse more effectively.

The n of the general formulas is preferably an integer of 2 to 15, more preferably 3 to 8. Such a saturated aliphatic carboxylic acid can enable the sediment deposited during long-time storage to redisperse more effectively.

The acid dissociation constant pKa1 of the saturated aliphatic carboxylic acid is preferably 4.0 or more, more preferably 4.0 to 4.5, still more preferably 4.1 to 4.5. If the saturated aliphatic carboxylic acid is divalent or more polyvalent, the second acid dissociation constant pKa2 is preferably 5.0 or more. The acid dissociation constant pKa can be measured by, for example, titration, absorptiometry, or capillary electrophoresis. Table 1 shows the acid dissociation constants pKa and redispersing effect of exemplary saturated aliphatic carboxylic acids.

TABLE 1

|  | pKa1 | pKa2 | pKa3 | Redispersion |
|---|---|---|---|---|
| Palmitic acid | 4.64 |  |  | Good |
| Adipic acid | 4.26 | 5.03 |  | Excellent |

TABLE 1-continued

|  | pKa1 | pKa2 | pKa3 | Redispersion |
|---|---|---|---|---|
| Succinic acid | 4 | 5.24 |  | Good |
| Citric acid | 2.87 | 4.35 | 5.69 | Fair |

Photopolymerization Initiator

Preferably, the ink composition contains a polymerization initiator. Any compound may be used as the polymerization initiator without particular limitation as long as it can cure the radically polymerizable compound, and a known photo-radical polymerization initiator can be used.

Examples of the photo-radial polymerization initiator include, but are not limited to, aromatic ketones, acylphosphine oxides, thioxanthone compounds, aromatic onium salts, organic peroxides, thio compounds (such as thiophenyl group-containing compounds), α-aminoalkylphenone compounds, hexaaryl biimidazole compounds, ketoxime ester compounds, borates, azinium compounds, metallocene compounds, active ester compounds, compounds having a carbon-halogen bond, and alkylamine compounds.

Among these compounds, acylphosphine oxides and thioxanthone compounds are preferred. These photo-radical polymerization initiators generally facilitate the curing of the ink composition with a UV light emitting device, thus enhancing the curability of the ink composition.

Examples of the acylphosphine oxides include, but are not limited to, bis(2,4,6-trimethylbenzoyl)phenylphosphine oxide, (2,4,6-trimethylbenzoyl)diphenylphosphine oxide, and bis(2,6-dimethoxybenzoyl)-2,4,4-trimethylpentylphosphine oxide.

Examples of the thioxanthone compounds include, but are not limited to, thioxanthone, diethylthioxanthone, isopropylthioxanthone, and chlorothioxanthone. These may be used singly or in combination. Preferred diethylthioxanthone may be, but is not limited to, 2,4-diethylthioxanthone; preferred isopropylthioxanthone may be, but is not limited to, 2-isopropylthioxanthone; and preferred chlorothioxanthone may be, but is not limited to, 2-chlorothioxanthone. The ink composition containing such a thioxanthone compound as the photopolymerization initiator can exhibit high curability, storage stability, and ejection stability. Preferably, the thioxanthone compound contains diethylthioxanthone. Diethylthioxanthone can more efficiently produce an active species that can initiate radical polymerization with UV light in a wide range of frequency.

Other photo-radical polymerization initiators may be used without particular limitation. Examples of such a photo-radical polymerization initiator include acetophenone, acetophenone benzylketal, 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropane-1-one, 2-hydroxy-2-methyl-1-phenylpropane-1-one, and 2-methyl-1-[4-(methylthio)phenyl]-2-morpholinopropane-1-one.

Other Additives

The ink composition may further contain other additives or constituents. For example, the ink composition may contain known additives, such as, but not limited to, a slipping agent (surfactant), a polymerization promoter, a penetration enhancer, a wetting agent (moisturizing agent), a fixing agent, a fungicide, a preservative, an antioxidant, an ultraviolet absorbent, a chelating agent, a pH adjuster, and a thickener.

Preparation of the Radically Polymerizable Photo-Curable Ink Jet Ink Composition The ink composition can be prepared in any known process without particular limitation. For example, the ink composition can be prepared by mixing the above-described constituents to disperse in each other with agitation. Alternatively, a pigment dispersion containing a white pigment may be prepared in advance, and then other constituents are mixed to the pigment dispersion.

Ink Container

The ink composition of the present embodiment may be provided in the form of an ink container containing the ink composition. The ink container is prepared by placing the ink composition in a container so as to be suitable for transportation. The container portion of the ink container is preferably a bag (ink bag) whose portion in contact with the ink composition is made of a film, from the viewpoint of reducing the weight. The film may be made of a resin such as polyethylene terephthalate, polyethylene, polypropylene, polyvinyl chloride, or ethylene-vinyl alcohol copolymer, and ethylene-vinyl alcohol copolymer is suitable in view of low oxygen permeation and high durability. The film may include a resin layer and an inorganic coating made of, for example, alumina. The film preferably has a thickness of 0.05 to 0.3 mm.

EXAMPLES

The invention will be further described in detail with reference to Examples and Comparative Examples. However, the invention is not limited to the following Examples.

Materials of Ink Compositions

The following materials were mainly used in the ink compositions of the Examples and Comparative Examples. Radically Polymerizable Compounds:

Monofunctional monomer V#192 (phenoxyethyl acrylate, produced by Osaka Organic Chemical Industry)

Bifunctional monomer VEEA (2-(2-vinyloxyethoxy)ethyl acrylate, produced by Nippon Shokubai)

Trifunctional monomer SR444 (pentaerythritol triacrylate, produced by Sartomer)

Photopolymerization Initiators:
   Irgacure 819 (produced by BASF)
   Speedcure TPO (produced by Lambson)

Sensitizers:
   Speedcure DET (produced by Lambson)
   Hostalux KCB (produced by Clariant)

Polymerization Inhibitor:
   MEHQ (p-methoxyphenol)

Surfactant:
   BYK 3500 (produced by BYK)

White Pigment:
   Titanium oxide surface-treated with alumina, CR-50 (produced by Ishihara Sangyo Kaisha)

Polymer Dispersant:
   BYK 180 (produced by BYK)

Saturated Aliphatic Carboxylic Acid:
   Succinic acid
   Adipic acid
   Lauric acid
   Palmitic acid
   2-Naphthoic acid
   Citric acid
   Diethyl adipate Examples 1 to 9, Comparative Examples 1 to 3

Preparation of Ink Compositions and Ink Bags

Materials were mixed in the proportions (percent by mass) shown in Table 2 and sufficiently agitated to yield the ink compositions of Examples and Comparative Examples. To a 30 cm×15 cm rectangular bag whose four sides except the ink inlet were thermally sealed, 600 mL of any of the ink compositions was introduced through the ink inlet, and the ink inlet was sealed in a state where air did not remain in the bag. The bag was made of an ethylene-vinyl alcohol copolymer film having a thickness of 0.1 mm.

Evaluation

Redispersibility after Long-Time Storage

Ink bags containing respective ink compositions were allowed to stand at room temperature (25° C.) with the rectangular face of the ink bag in a horizontal position for a year. After the one year storage, each ink bag was reciprocally moved 50 times in the direction of the longer sides of the rectangular ink bag at a reciprocal shaking width of 5 cm and a speed of 50 cm/s, with the rectangular face of the ink bag in a horizontal position. Subsequently, the ink bag was turned upside down and was reciprocally moved 50 times in the same manner with the rectangular face of the ink gab in a horizontal position. After the ink composition in the ink bag was thus agitated, the ink composition was sampled from the upper side in the ink gab with the ink inlet facing up. Then, the absorbance of the sampled ink composition was measured with a spectrophotometer U-3300 (manufactured by Hitachi) and compared with the absorbance before the storage. The rate of change in absorbance calculated from measurements was evaluated according to the following criteria, and the results are shown in Table 2. As a larger amount of sediment settles, the density of the white pigment in the ink composition tends to be reduced, and accordingly the absorbance after storage is generally low.

Criteria:

| AA: | 0% to less than 10% |
|---|---|
| A: | 10% to less than 20% |
| B: | 20% to less than 30% |
| C: | 30% or more |

Solubility

Ink compositions were prepared as above. The ink compositions were visibly observed for insoluble residue and evaluated according to the following criteria, and the results are shown in Table 2.

Criteria:
   A: Insoluble residue was not observed.
   B: Insoluble residue was observed.

Storage Stability

The ink compositions prepared as above were each placed in the bag prepared as above and allowed to stand at 70° C. for 8 days. Before and after the 8-day storage, the viscosities of the ink compositions were measured at 20° C. with a viscometer MCR-300 (manufactured by Physica). The storage stability was evaluated from the rate of change in viscosity before and after the storage according to the following criteria, and the results are shown in Table 2.

Criteria:

| A: | Less than 10% |
|---|---|
| B: | 10% or more |

TABLE 2

| Type | | Material name | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|---|
| Polymerizable compound | Monofunctional monomer | V#192 | 19.10 | 19.10 | 19.10 | 19.10 | 19.10 | 19.10 | 19.10 | 19.10 | 19.10 | 19.10 | 19.10 | 19.10 |
| | Bifunctional monomer | VEEA | 48.16 | 48.16 | 48.19 | 48.06 | 48.16 | 48.16 | 48.16 | 48.22 | 48.01 | 48.26 | 48.16 | 48.16 |
| | Trifunctional monomer | SR444 | 5.55 | 5.55 | 5.55 | 5.55 | 5.55 | 5.55 | 5.55 | 5.55 | 5.55 | 5.55 | 5.55 | 5.55 |
| Additive | Photopolymerization initiator | Irgacure 819 | 2.25 | 2.25 | 2.25 | 2.25 | 2.25 | 2.25 | 2.25 | 2.25 | 2.25 | 2.25 | 2.25 | 2.25 |
| | | Speedcure TPO | 4.80 | 4.80 | 4.80 | 4.80 | 4.80 | 4.80 | 4.80 | 4.80 | 4.80 | 4.80 | 4.80 | 4.80 |
| | Sensitizer | Speedcure DETX | 0.50 | 0.50 | 0.50 | 0.50 | 0.50 | 0.50 | 0.50 | 0.50 | 0.50 | 0.50 | 0.50 | 0.50 |
| | | Hostalux KCB | 0.08 | 0.08 | 0.08 | 0.08 | 0.08 | 0.08 | 0.08 | 0.08 | 0.08 | 0.08 | 0.08 | 0.08 |
| | Polymerization inhibitor | MEHQ | 0.36 | 0.36 | 0.36 | 0.36 | 0.36 | 0.36 | 0.36 | 0.36 | 0.36 | 0.36 | 0.36 | 0.36 |
| | Surfactant | BYK3500 | 0.20 | 0.20 | 0.20 | 0.20 | 0.20 | 0.20 | 0.20 | 0.20 | 0.20 | 0.20 | 0.20 | 0.20 |
| | Pigment | Titanium oxide, alumina surface-treated | 18.00 | 18.00 | 18.00 | 18.00 | 18.00 | 18.00 | 18.00 | 18.00 | 18.00 | 18.00 | 18.00 | 18.00 |
| | Dispersant | BYK180 | 0.90 | 0.90 | 0.90 | 0.90 | 0.90 | 0.90 | 0.90 | 0.90 | 0.90 | 0.90 | 0.90 | 0.90 |
| | Dispersing assistant | Succinic acid | 0.10 | | | | | | | | | | | |
| | | Adipic acid | | 0.10 | | | | | | | | | | |
| | | Lauric acid | | | 0.07 | | | | | | | | | |
| | | Palmitic acid | | | | 0.20 | | | | | | | | |
| | | 2-Naphthoic acid | | | | | 0.10 | | | | | | | |
| | | Citric acid | | | | | | 0.10 | | | | | | |
| | | Diethyl adipate | | | | | | | 0.10 | 0.04 | 0.25 | | 0.10 | 0.10 |
| Total | | | 100.00 | 100.00 | 100.00 | 100.00 | 100.00 | 100.00 | 100.00 | 100.00 | 100.00 | 100.00 | 100.00 | 100.00 |
| Redispersibility after long time storage | | | A | AA | A | AA | A | A | B | B | A | C | C | C |
| Solubility | | | A | A | A | A | A | A | A | A | B | A | A | A |
| Storage stability | | | A | A | A | A | A | A | A | A | B | A | A | A |

The above results show that the ink composition of the disclosure, which contains a specific saturated aliphatic carboxylic acid, has good redispersibility after long-time storage. In addition, since the ink composition has good redispersibility and viscous sediment, even if formed, can be redispersed by agitation, nozzle clogging or unevenness in the density of the image caused by the settling of the white pigment can be minimized. Furthermore, the bag used in the Examples was not broken or cracked even by agitation, and was thus resistant to agitation for redispersion.

The entire disclosure of Japanese Patent Application No.: 2013-061556, filed Mar. 25, 2013 is expressly incorporated by reference herein.

What is claimed is:

1. A radically polymerizable photo-curable ink jet ink composition comprising:
   a radically polymerizable compound, wherein the radically polymerizable compound content is in the range of 40% to 80% by mass relative to the total mass of the ink composition;
   a white pigment, wherein the white pigment content is in the range of 5% to 50% by mass relative to the total mass of the ink composition;
   a polymer dispersant; and
   at least one saturated aliphatic dicarboxylic acid, wherein the saturated aliphatic dicarboxylic acid content is in the range of 0.05% to 0.25% by mass relative to the total mass of the ink composition.

2. The radically polymerizable photo-polymerizable ink jet ink composition according to claim 1, wherein the saturated aliphatic dicarboxylic acid has 2 to 15 carbon atoms in the portion other than the carboxyl group.

3. The radically polymerizable photo-curable ink jet ink compositing according to claim 1, wherein the saturated aliphatic dicarboxylic acid content is in the range of 0.05% to 0.2% by mass relative to the total mass of the ink composition.

4. The radically polymerizable photo-curable ink jet ink composition according to claim 1, further comprising a photopolymerization initiator.

5. The radically polymerizable photo-curable ink jet ink composition according to claim 1, wherein the white pigment contains metal oxide particles.

6. The radically polymerizable photo-curable ink jet ink composition according to claim 1, wherein the saturated aliphatic dicarboxylic acid is at least one compound selected from the general formula (1):

$$COOH-(CH_2)_n-COOH \qquad (1);$$

wherein n represents an integer of 2 to 15.

7. The radically polymerizable photo-curable ink jet ink composition according to claim 6, wherein the n of the general formulas represents an integer of 3 to 8.

* * * * *